(No Model.)
C. STUART.
INDICATING TAPE MEASURE.
No. 537,082. Patented Apr. 9, 1895.
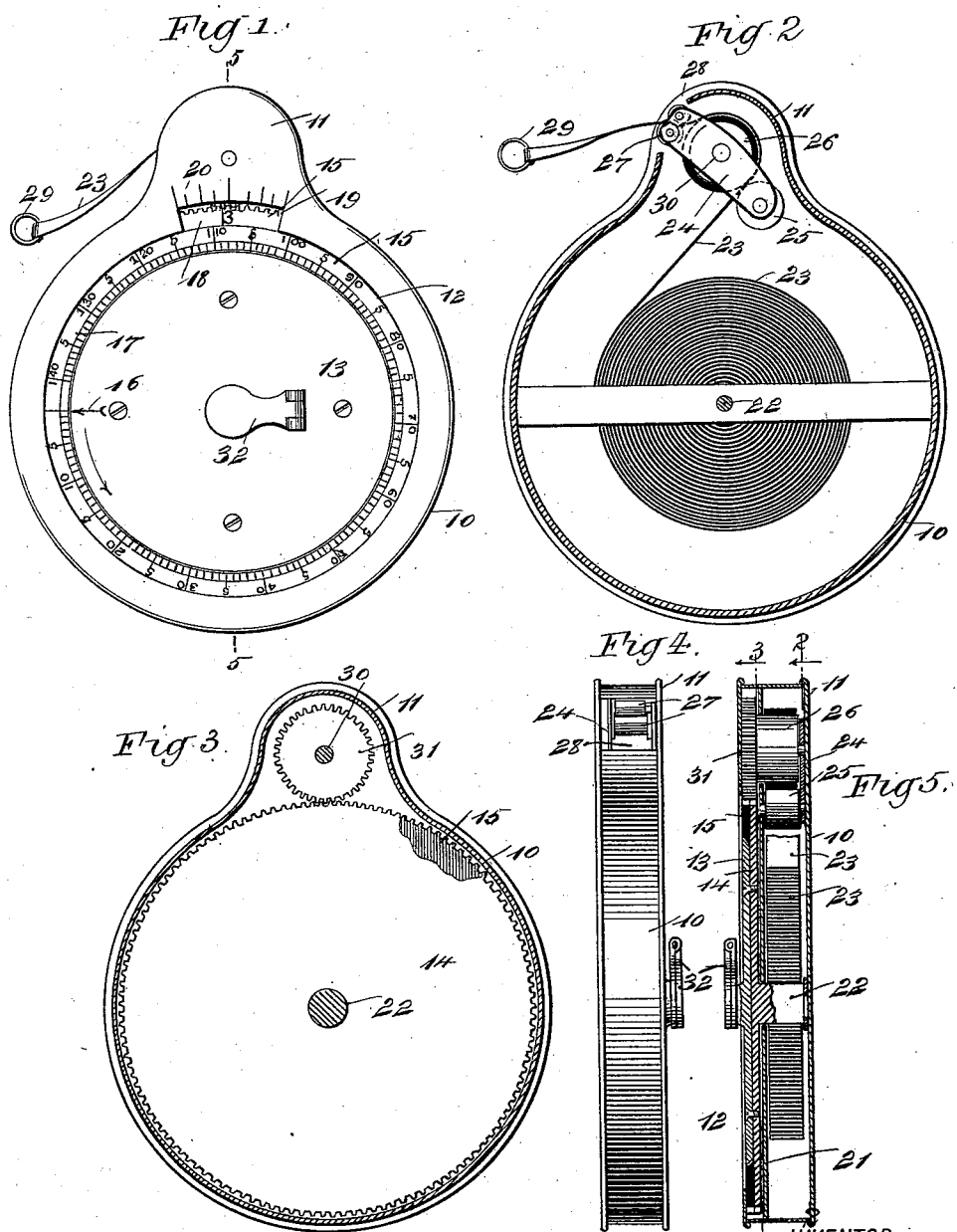
WITNESSES:
Paul Johol
W. B. Hutchinson
INVENTOR
C. Stuart
BY
Munn & Co
ATTORNEYS.

UNITED STATES PATENT OFFICE.

CHARLES STUART, OF TURLOCK, CALIFORNIA.

INDICATING TAPE-MEASURE.

SPECIFICATION forming part of Letters Patent No. 537,082, dated April 9, 1895.

Application filed June 2, 1894. Serial No. 513,243. (No model.)

*To all whom it may concern:*

Be it known that I, CHARLES STUART, of Turlock, in the county of Stanislaus and State of California, have invented a new and Improved Registering Tape-Measure, of which the following is a full, clear, and exact description.

My invention relates to improvements in measuring instruments; and the object of my invention is to produce a tape measure having its tape arranged in substantially the usual way, but having the tape made without numbers or gage marks, and connected with indicating dials on the face of the case, so that when the tape is pulled out registering mechanism is operated which indicates accurately and with great minuteness on the dials the exact length of tape which has been extended, so that the person may, at a glance at the dials, know the measurement made.

A further object of my invention is to arrange and construct this registering mechanism in the simplest manner possible, so that while being nice in operation it is still strong and durable and little likely to get out of order.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a front view of the apparatus embodying my invention. Fig. 2 is a cross section on the line 2—2 of Fig. 5. Fig. 3 is a broken cross section on the line 3—3 of Fig. 5. Fig. 4 is an edge view of the device; and Fig. 5 is a section on the line 5—5 of Fig. 1.

The device has a case 10, which is of the usual type, being in the shape of a short cylinder and having on one side an extension 11 in which certain of my improved mechanism is held. The case has on one side or end an opening 12, in which are exhibited the dials 13 and 15, the inner dial 13 being secured to a cog wheel 14 which turns in the case, as hereinafter described, and the outer dial 15 turns on the inner dial and is provided with teeth on its periphery, the dial 15 being of the same circumference as the cog wheel 14.

It will be understood that the dial 13 and cog wheel 14 may, if desired, be made in a single piece.

The dial 13 has an indicating mark 16 near one edge, which comes opposite the gage marks 17 on the dial 15, these marks being made to indicate feet, while near the outer edge of the dial 15 are other gage marks, as shown at 18, which indicate inches and which are exposed in the slot 19 of the case 10, this slot having gage marks 20 near its outer edge to indicate fractions of an inch.

The two dials are arranged between the outer side of the case and the partition 21 in the case, and the inner cog wheel 14 has a spindle 22 which is journaled centrally in the case in the usual manner and carries the tape line 23 which may be of any suitable material and is unmarked. The tape line extends outward through a guide frame 24, which is secured in the extension 11 of the case between a guide pulley 25 and a friction pulley 26, which is journaled in the guide frame and is preferably rubber covered, over the said pulley 26 and thence outward between the guide pulleys 27 and through a slot 28 in the case, the tape terminating in the usual ring 29 which prevents it from going in too far.

The shaft 30 of the friction wheel 26 has a pinion 31, which meshes with the cog wheel 14 and the teeth of the dial 15, so that when the tape is pulled out the pinion is turned and a movement imparted to both dials. The dial 15 has one more tooth than the dial 13, and consequently the pinion 31, in moving the dials a revolution, causes one to be moved slightly faster than the other, owing to the difference in teeth, and this difference is such that it amounts to the distance of one gage mark on the dial 15, so that when the dials have been turned a revolution the fact will be indicated by the mark 16, and the size of the pinion 31 and friction wheel 26 is such that when the tape line is pulled out a foot, it will just move the dials a revolution.

The number of inches that the tape line is pulled out are indicated by the gage marks 18 and 20, and thus in using the tape line for measuring, it is only necessary to pull it out and the exact distance will be indicated in feet, inches, and fractions thereof on the dials of the device. The device has the usual folding crank 32 for revolving the spindle 22 and winding up the tape line.

Having thus described my invention, I claim as new and desire to secure by Letters Patent—

1. A tape measure, comprising a case having peripherally toothed dials on its face, a tape line arranged in the usual way in the case, and a pinion meshing with the teeth of both dials to impart a differential movement to them and actuated by the movement of the line to indicate its length on the dials, substantially as described.

2. A tape measure, comprising a case having an opening in one side, a dial arranged in the opening and provided with an indicating mark and with a spindle, a second dial journaled on the first dial and provided with gage marks, a tape line secured to the spindle and extending outward through the case, and a pinion turned by the tape line and geared to the two dials so as to impart a differential movement to them, substantially as described.

3. A tape measure, comprising a case having an opening in one side, a dial journaled in the opening and provided with an indicating mark and also with teeth at one edge, a spindle secured to the dial, a second toothed dial connected to the first dial and provided with gage marks, a friction pulley journaled in the case, guide pulleys opposite the friction pulley, a tape line secured to the spindle and extending over the friction and guide pulleys, and a pinion carried by the friction pulley and meshing with the dials, substantially as described.

4. A tape measure, comprising a case, a dial having teeth on its edge, an indicating mark on said dial, and a spindle journaled in the case, a second dial journaled on the first dial and provided with gage marks and with a different number of teeth from the first dial, a tape line secured to the spindle and extending outward through the case, and a pinion journaled in the case and actuated by the movement of the tape line, the pinion being geared to the dials, substantially as described.

5. The combination, with the case, the toothed differential dials journaled therein, the spindle on one of the dials, and the tape line secured to the spindle, of the guide frame in the case, the friction pulley journaled in the guide frame and carrying a pinion which meshes with the dials, and guide pulleys on opposite sides of the friction pulley, substantially as described.

6. The combination, with the case having an open side, with a slot on one side of the opening and gage marks at one edge of the slot, of the dials, differentially toothed and turning in the opening of the case and opposite the slot, the tape line in the case, and a gear mechanism actuated by the tape line to turn the dials, substantially as described.

CHARLES STUART.

Witnesses:
LINEOUS COTTERELL,
J. M. PEARSON.